(12) United States Patent
Dermu

(10) Patent No.: US 9,264,421 B2
(45) Date of Patent: Feb. 16, 2016

(54) ACCESSING A PRIMARY DEVICE USING A WEARABLE DEVICE AND A WIRELESS LINK

(71) Applicant: Motorola Mobility LLC, Libertyville, IL (US)

(72) Inventor: Francois M Dermu, San Mateo, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 13/973,000

(22) Filed: Aug. 22, 2013

(65) Prior Publication Data
US 2015/0058942 A1 Feb. 26, 2015

(51) Int. Cl.
*G06F 21/00* (2013.01)
*H04L 29/06* (2006.01)
*H04W 12/08* (2009.01)
(Continued)

(52) U.S. Cl.
CPC ............ *H04L 63/0823* (2013.01); *G06F 21/35* (2013.01); *G06F 21/445* (2013.01); *H04L 63/0853* (2013.01); *H04L 63/107* (2013.01); *H04W 4/008* (2013.01); *H04W 12/06* (2013.01); *H04W 12/08* (2013.01); *G06F 2221/2111* (2013.01); *H04L 63/0492* (2013.01); *H04W 84/18* (2013.01)

(58) Field of Classification Search
CPC ....... G06F 21/33; G06F 21/35; G06F 21/445; H04W 12/06; H04L 9/0825; H04L 9/3263; H04L 9/3268
USPC .............. 726/5, 6, 16, 20; 713/161, 176, 181, 713/186; 455/41.1
See application file for complete search history.

(56) References Cited

U.S. PATENT DOCUMENTS 7,597,250 B2   10/2009   Finn
7,756,478 B2 *  7/2010   Eisenbach ................... 455/41.2
(Continued)

FOREIGN PATENT DOCUMENTS

EP    1881663 A1    1/2008

OTHER PUBLICATIONS

Chase Bonar, Here's why Apple's iWatch could be a Google Glass killer, http://www.phonedog.com/2013/03/07/here-s-why-apple-s-iwatch-could-be-a-google-glass-killer/, Mar. 7, 2013, all pages.
(Continued)

*Primary Examiner* — Izunna Okeke
*Assistant Examiner* — Hee Song
(74) *Attorney, Agent, or Firm* — Morris & Kamlay LLP

(57) ABSTRACT

A method of operation includes detecting that a wearable device is being worn, receiving a certificate from a primary device over a secure wireless link where the wearable device is paired to the primary device using the secure wireless link, storing the certificate in memory of the wearable device, and sending the certificate, over the secure wireless link, to the primary device to unlock the primary device. The method may further include detecting that the wearable device is no longer being worn, and eradicating the certificate from memory of the wearable device in response to detecting that the wearable device is no longer being worn. In some embodiments, the method may also include detecting that the secure wireless link is disconnected, and eradicating the certificate from memory of the wearable device in response to detecting that the secure wireless link is disconnected. The present disclosure also provides a wearable device.

18 Claims, 6 Drawing Sheets

(51) Int. Cl.
*G06F 21/35* (2013.01)
*H04W 4/00* (2009.01)
*H04W 12/06* (2009.01)
*G06F 21/44* (2013.01)
*H04W 84/18* (2009.01)

(56) References Cited

U.S. PATENT DOCUMENTS

| | | | |
|---|---|---|---|
| 8,249,556 B2 * | 8/2012 | Olsen et al. | 455/411 |
| 8,249,558 B2 | 8/2012 | Olsen et al. | |
| 8,364,963 B2 * | 1/2013 | Lind et al. | 713/171 |
| 8,498,618 B2 * | 7/2013 | Ben Ayed | 455/411 |
| 2003/0025603 A1 | 2/2003 | Smith | |
| 2003/0199267 A1 | 10/2003 | Iwasa et al. | |
| 2008/0196086 A1 | 8/2008 | Shintani et al. | |
| 2009/0021350 A1 | 1/2009 | Hatta et al. | |
| 2009/0249478 A1 * | 10/2009 | Rosener et al. | 726/19 |
| 2011/0214158 A1 * | 9/2011 | Pasquero et al. | 726/2 |
| 2013/0183936 A1 * | 7/2013 | Smtih et al. | 455/411 |
| 2014/0149746 A1 * | 5/2014 | Yau | 713/185 |

OTHER PUBLICATIONS

International Search Report and Written Opinion in Application No. PCT/US2014/051615 mailed Oct. 23, 2014.

* cited by examiner

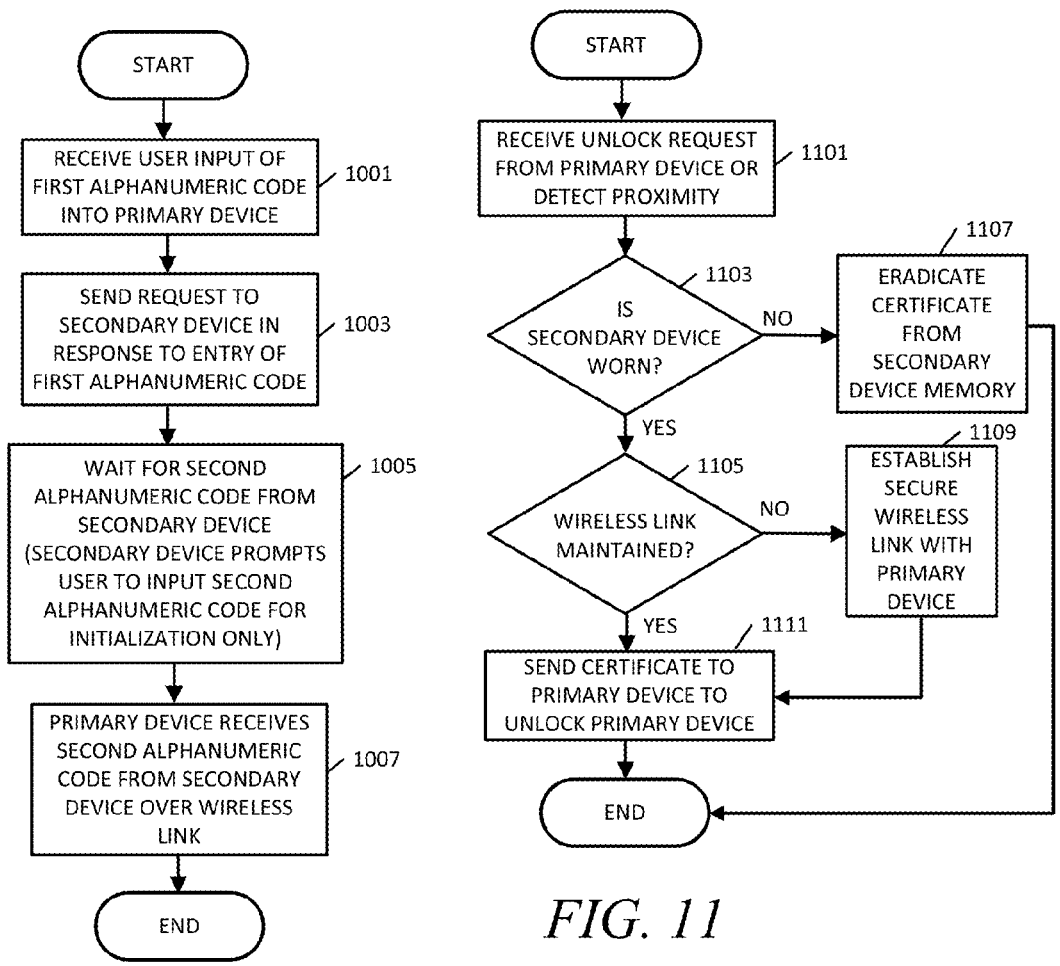
FIG. 10
FIG. 11
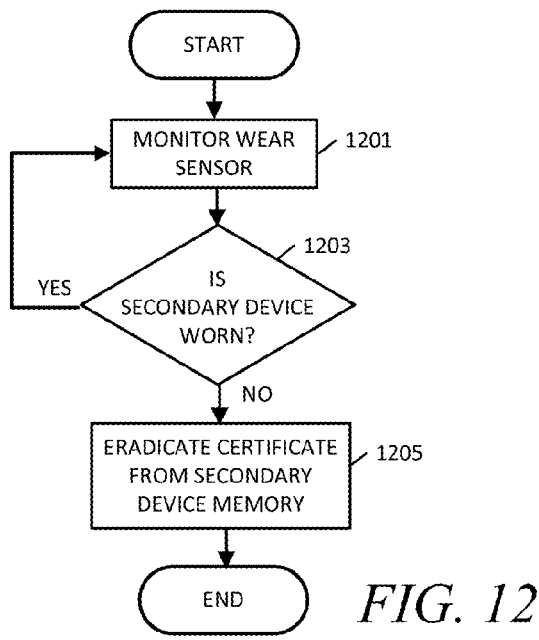
FIG. 12

ACCESSING A PRIMARY DEVICE USING A WEARABLE DEVICE AND A WIRELESS LINK

CROSS-REFERENCE TO RELATED APPLICATIONS

None.

FIELD OF THE DISCLOSURE

The present disclosure relates generally to mobile device access and security and more particularly to wirelessly paired devices and methods of securing device access.

BACKGROUND

Mobile devices include locking mechanisms that lock the device or user interface to prevent unauthorized access. Many mobile devices may be paired to other devices using wireless technologies to provide additional or enhanced features and capabilities. Some pair-able devices may be "wearable devices" in the sense that these devices may be worn by a user as a fashion accessory such as jewelry, an article of clothing, a portion of an article of clothing, etc. However, adding mobile devices to a user's repertoire of devices increases security and access concerns.

BRIEF DESCRIPTION OF THE DRAWINGS

FIG. 10 is a flowchart of a method of operation of a primary device in accordance with an embodiment.

FIG. 11 is a flowchart of a method of operation of a secondary device in accordance with an embodiment.

FIG. 12 is a flowchart of a method of operation of a secondary device in accordance with an embodiment.

DETAILED DESCRIPTION

Figure 1:
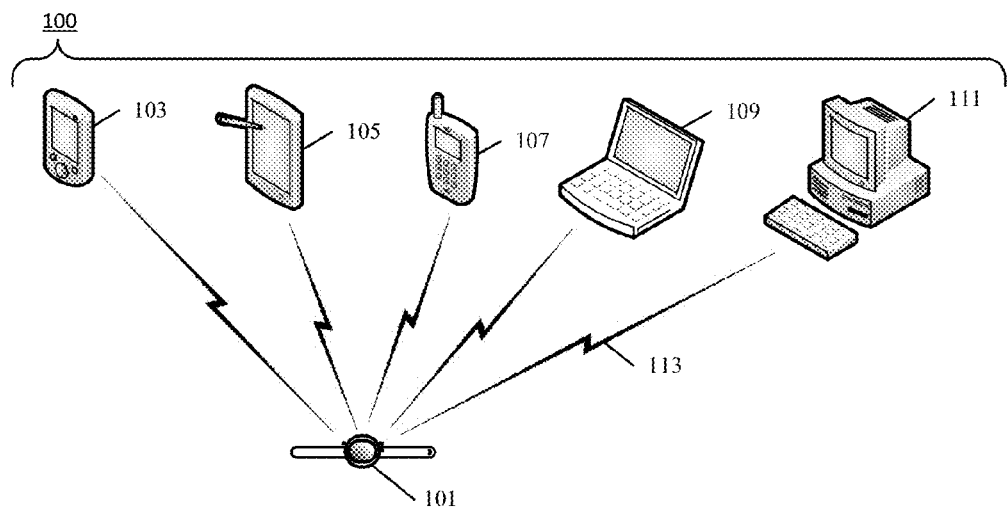
FIG. 1 is a diagram showing various primary devices that may be paired with a secondary, wearable device using a wireless link.

Briefly, the disclosed embodiments provide for a mechanism to unlock a primary device using a paired wearable device. The primary device may be a smartphone, tablet or other computing device, etc. The wearable device is paired to the primary device and stores a certificate for granting access to the primary device. If the wearable device is not worn, the certificate is eradicated so that the device may no longer be used to access the primary device, unless a subsequent security procedure is followed to generate a new certificate.

The present disclosure provides a method of operation that includes detecting, by a wearable device, that the wearable device is being worn; receiving, by the wearable device, a certificate from a primary device over a secure wireless link where the wearable device is paired to the primary device using the secure wireless link; storing the certificate in memory of the wearable device; and sending the certificate, over the secure wireless link, to the primary device to unlock the primary device. The method may further include detecting that the wearable device is no longer being worn; and eradicating the certificate from memory of the wearable device in response to detecting that the wearable device is no longer being worn. In some embodiments, the method may also include detecting that the secure wireless link between the wearable device and the primary device is disconnected; and eradicating the certificate from memory of the wearable device in response to detecting that the secure wireless link between the wearable device and the primary device is disconnected.

The present disclosure also provides a wearable device. In one embodiment, a wearable device includes a wireless transceiver, operative to pair with a primary device to establish a secure wireless link, a wear sensor, and wear detection logic, operatively coupled to the wear sensor. The wear detection logic is operative to detect that the wearable device is being worn by using the wear sensor. The wearable device also includes certificate handler that is operatively coupled to the wear detection logic. The certificate handler is operative to receive a certificate from a primary device over a secure wireless link when the wearable device is paired to the primary device using the secure wireless link and to send the certificate, over the secure wireless link, to the primary device to unlock the primary device. The wearable device also includes memory that is operatively coupled to the certificate handler and that is operative to store the certificate.

The wear detection logic is also operative to detect that the wearable device is no longer being worn. In that case, the certificate handler will eradicate the certificate from the memory of the wearable device in response to detecting that the wearable device is no longer being worn.

The present disclosure also provides a system that includes the wearable device and a primary device. In one embodiment, the primary device includes a primary device wireless transceiver that is operative to communicate with the wearable device wireless transceiver to establish the secure wireless link, and a certificate generator that is operatively coupled to the primary device wireless transceiver. The primary device also includes primary device lock logic that is operatively coupled to the primary device wireless transceiver. The primary device lock logic is operative to unlock the primary device in response to receiving the certificate from the wearable device.

Turning now to the drawings, FIG. 1 illustrates various primary devices 100 that may be paired with a secondary, wearable device 101 using a wireless link 113. The primary devices 100 may be for example, a personal digital assistant (PDA) 103, a tablet or e-book reader 105, a mobile telephone 107, a laptop computer 109, personal computer 111, or some other device that has a wireless link capability. The secondary, wearable device may be, for example, a smart watch 101. Any one of the example primary devices 100 may establish a wireless link 113 with the secondary device 101 such that the primary device and the secondary device are paired devices. The wireless link 113 may be established using, for example, WiFi®, Bluetooth®, or some other suitable wireless technology. The wireless link 113 is a secure wireless link in accordance with the embodiments.

Any one of the primary devices 100 may also be capable of establishing a corresponding network connection to a network using any suitable wireless or wire line connection technology and may connect to any of various wide area networks (WAN), wireless local area networks (WLAN) and/or to the Internet.

Figure 2:
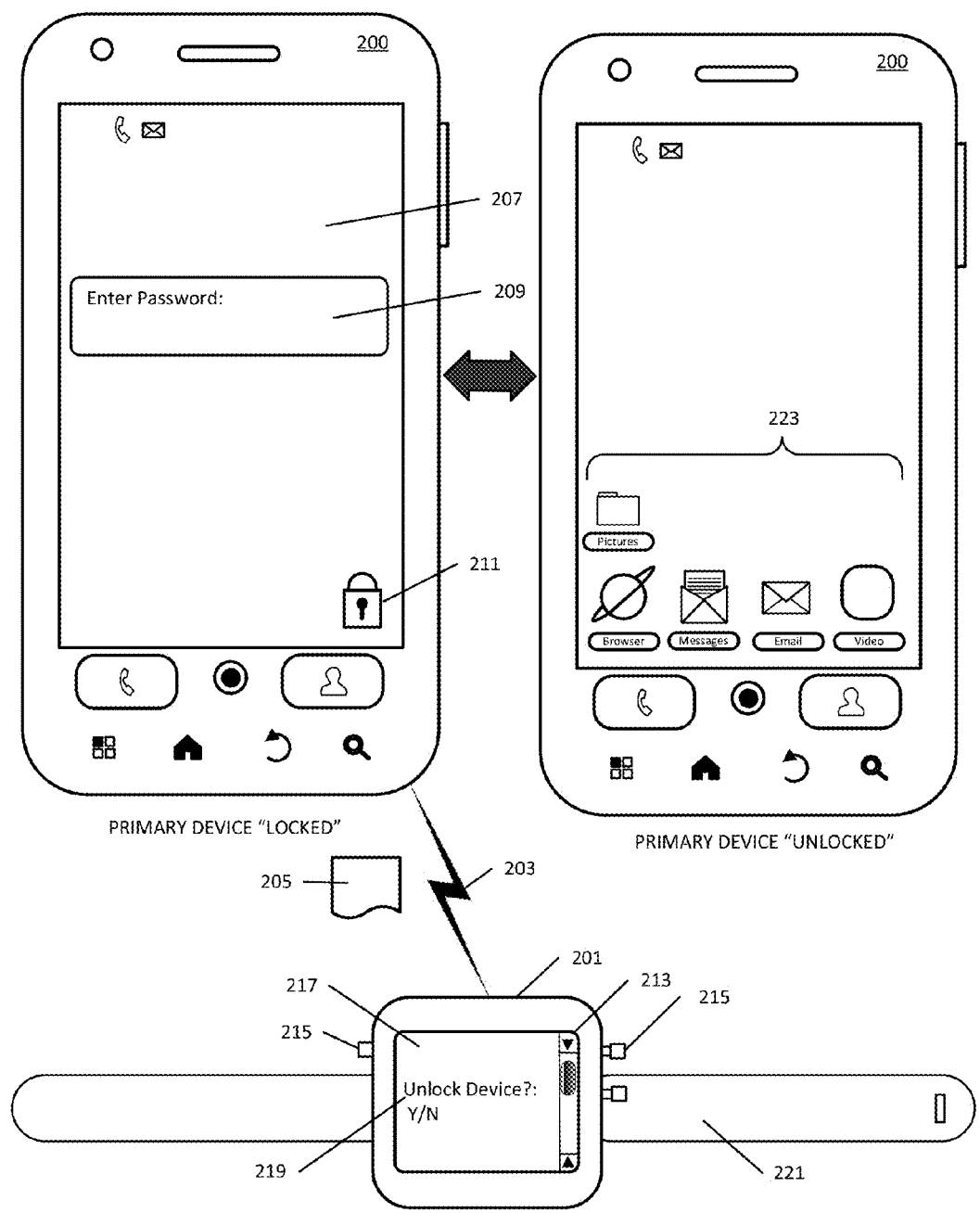
FIG. 2 is block diagram providing an example of unlocking a primary device using a secondary, wearable device in accordance with an embodiment.

FIG. 2 provides an example of unlocking a primary device 200 using a secondary, wearable device 201 in accordance with an embodiment. FIG. 2 provides two views of the same primary device 200 where the leftmost side view is of the "locked" primary device 200 and the rightmost side view is of the "unlocked" primary device 200, both views being of the same primary device 200. The primary device 200 is paired with a secondary device 201 using a wireless link 203. In the example of operation illustrated in FIG. 2, the primary device 200 establishes a "pairing" with the secondary device 201 using the wireless link 203 which, as mentioned above, may be implemented using any suitable wireless technology. In one example, the wireless link 203 may be implemented using Bluetooth®. Thus in an example using Bluetooth® for the wireless link 203, the primary device 200 will engage in a Bluetooth® pairing mechanism to establish a bond with the secondary device 201. This may be accomplished by using any suitable pairing mechanism such as, but not limited to, using Secure Simple Pairing (SSP) in accordance with the Bluetooth® v2.1 or equivalent specification or by using some other pairing mechanism. For example, if a legacy pairing mechanism is used, the user may be required to enter a numeric or alpha-numeric pin code into the primary device 200 and/or the secondary device 201 in order to establish the bond. Alternatively, if using an SSP pairing mechanism a numeric code may be used to implement a passkey. In another SSP pairing mechanism example, the primary and secondary device may utilize numeric comparison where a "yes" or "no" entry is made in response to a number displayed on the primary device 200 and secondary device 201. In that case, the user may respond by selecting "yes" if the two numbers displayed are identical. In yet other SSP pairing mechanisms, a "just works" mechanism may be employed where the user may only need to provide a verification input on one or both of the devices to confirm that the pairing should be made. In yet another example, an out-of-band mechanism may be employed such as by using Near Field Communication (NFC) to exchange information between the primary device 200 and the secondary device 201 for use in the pairing process. Such mechanisms may be considered secure wireless connections when "man-in-the-middle" (MITM) protection is provided by the corresponding pairing mechanism employed in establishing the wireless link 203. In other words, a secure wireless link 203 may employ some form of cryptography in order to reduce the likelihood of MITM attacks that monitor the wireless link during establishment in order to mimic one of the paired devices or to otherwise intercept communication between the devices.

After establishment of the secure wireless link 203 between the primary device 200 and secondary device 201, the secondary device 201 may be used to unlock the primary device 200 a using the wireless link 203 as illustrated in the example of FIG. 2. The locked primary device 200 may display a password entry field 209 on the display 207 upon the primary device 200 being locked or in response to the user attempting to access the primary device 200. The locked primary device 200 may also display an icon 211 or some other indication that informs the user that the primary device 200 is locked. However, in other embodiments, the unlocking procedure will occur as a background procedure and no particular indications need be provided to the user.

In some embodiments the password entry field 209 may only be displayed when the user attempts to access the locked primary device 200. In this case the locked primary device 200 may send an unlock request to the secondary device 201 over the wireless link 203. Alternatively, in other embodiments, the secondary device 201 may detect that it is in proximity to the locked primary device 200 a by using a proximity sensor or NFC technology. In any of the various embodiments, the secondary device 201 sends a certificate 205 to the locked primary device 200 either in response to an unlock request or in response to proximity detection. The primary device 200 will receive the certificate 205 over the wireless link 203 and will authenticate the certificate 205. If the certificate 205 is found valid, the primary device 200 will become unlocked and will appear, for example, as the unlocked primary device 200 shown on the rightmost side of FIG. 2. That is, upon being unlocked, the display 207 will allow the user to access one or more application icons 223 or take some other action such as making a phone call, etc. In some embodiments, "unlocking" the primary device 200 may be related to initiating an application on the primary device 200 where the application enables access to the primary device 200 and other applications. In one example embodiment, the primary device 200 may be unlocked by activating a voice recognition application of the primary device 200.

In various embodiments, the secondary device 201 may either receive an unlock request from the locked primary device 200 or may detect that it is in proximity to the locked primary device 200 by using NFC technology as was discussed above. In some embodiments, the secondary device 201 may provide a user prompt 219 on a display 217 of the secondary device 201 asking the user whether the primary device 200 should be unlocked. The user may then select "yes" to unlock the primary device 200, or "no" to maintain the primary device 200 in a locked state.

The secondary device 201 may include various features in the various embodiments, some examples of which are shown in FIG. 2. For example, the secondary device 201 may include a scroll feature 213 either on the display 217 as a touch screen feature or by way of having a touch sensor control positioned adjacent to the display 217. An example of such a touch sensor control is described in U.S. patent application Ser. No. 13/770,259, filed Feb. 19, 2013, entitled "Sensing Strip For Providing Touch and Gesture Controls" which is hereby incorporated by reference herein. The secondary device 201 may also include a set of control buttons 215 such that the user may select a yes or no response to the inquiry of the user prompt 219, or take other actions with respect to the secondary device 201.

In an unlocking method of operation in accordance with one embodiment, for example, if the secondary device 201 displays the user prompt 219, the user may respond by selecting "yes." In response to this selection input, the secondary device 201 will send certificate 205 to the primary device 200 over the wireless link 203. The locked primary device 200 will receive the certificate 205, verify its authenticity and unlock the primary device 200 which may then appear as the unlocked primary device 200 shown on the rightmost side of FIG. 2.

In accordance with the embodiments, the secondary device 201 stores the certificate 205 and eradicates the certificate 205 from memory under certain conditions. For example, the secondary device 201 must be worn by the user by securing the wrist strap 221 to the user's wrist. That is, in order for the secondary device 201 to maintain a stored copy of the certificate 205, the secondary device 201 must be worn by the user either at the time of pairing to the primary device 200 or immediately subsequent to pairing the devices. In accordance with the embodiments, the certificate 205 will be eradicated from memory of the secondary device 201 if either the secondary device 201 is no longer worn by the user or if the wireless link 203 is broken such that it would need to be re-established. Thus, if the user were to wear the secondary device 201 but move outside a radio coverage range of the wireless link 203 such that the wireless link 203 is disconnected, then the secondary device 201 will automatically eradicate the certificate 205 from memory. Also, if the user were to remove the secondary device 201 from the user's wrist by disengaging the wrist strap 221 and removing the secondary device 201 from contact with the user's wrist, then the certificate 205 will also be eradicated from memory of the secondary device 201. Therefore another party who obtained access to the secondary device 201 would not be able to use it to unlock the primary device 200 because the certificate 205 would be permanently eradicated from memory of the secondary device 201 in accordance with the embodiments. In some embodiments, the primary device 200 will also eradicate the certificate from memory of the primary device 200 in response to either a notification message from the secondary device 201, detecting that the wireless link 203 with the secondary device 201 is disconnected, or both conditions.

Figure 3:
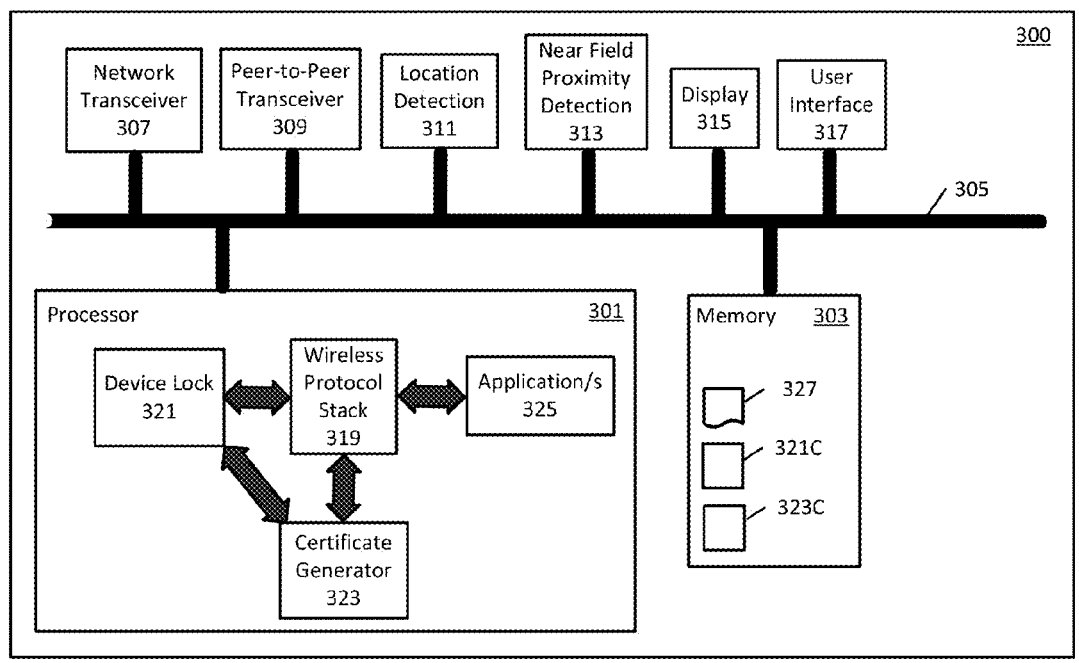
FIG. 3 is schematic block diagram of a primary device in accordance with an embodiment.
Figure 4:
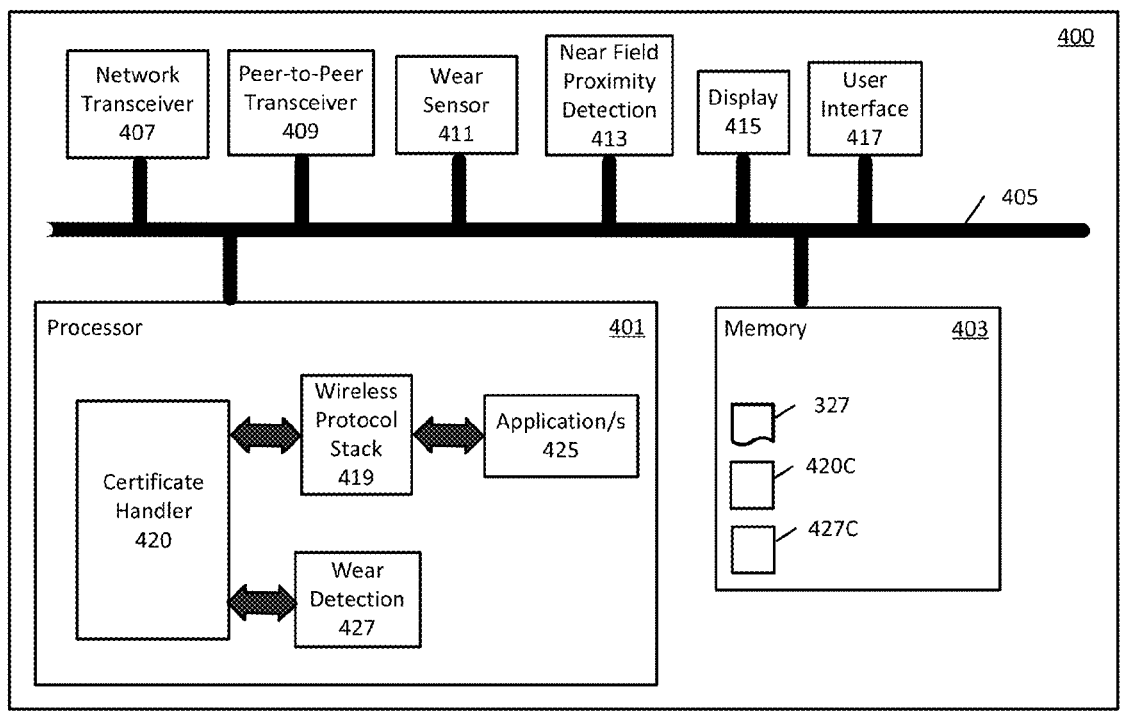
FIG. 4 is a schematic block diagram of a secondary device in accordance with an embodiment.

An example schematic block diagram of a primary device 300 in accordance with an embodiment is provided in FIG. 3 and an example secondary device 400 in accordance with an embodiment is provided in FIG. 4. It is to be understood that FIG. 3 and FIG. 4 are limited to showing only those components useful to describe the features and advantages of the various embodiments, and to describe how to make and use the various embodiments to those of ordinary skill. It is therefore to be understood that various other components, circuitry, and devices etc. may be present in order to implement an apparatus such as the primary device 300 or the secondary device 400 and that those various other components, circuitry, devices, etc., are understood to be present by those of ordinary skill. For example, the primary device 300 or the secondary device 400 may include inputs for receiving power from a power source, a power distribution bus, a battery, etc. Thus it is to be understood that such various other components, circuitry, or devices are omitted for the purpose of clarity.

The various components, circuitry, devices etc. described with respect to the figures including, but not limited to, those described using the terms "logic" or "modules" may be implemented in various ways such as by software and/or firmware executing on one or more programmable processors such as a central processing unit (CPU) or the like, or by ASICs, DSPs, FPGAs, hardwired circuitry (logic circuitry), or any combinations thereof.

The terminology "operatively coupled" as used herein refers to coupling that enables operational and/or functional communication and relationships between the various components, circuitry, devices etc. described as being operatively coupled and may include any intervening items (i.e. buses, connectors, other components, circuitry, devices etc.) used to enable such communication such as, for example, data communication buses or any other intervening items that one of ordinary skill would understand to be present. Also, it is to be understood that other intervening items may be present between "operatively coupled" items even though such other intervening items are not necessary to the functional communication facilitated by the operative coupling. For example, a data communication bus may provide data to several items along a pathway along which two or more items are operatively coupled, etc. Such operative coupling is shown generally in FIG. 3 and FIG. 4 described herein.

Operative coupling may also exist between modules or components implemented as software or firmware executing on a processor and such "software coupling" may be implemented using libraries or application programming interfaces (APIs) or other software interfacing techniques as appropriate.

Turning to FIG. 3, a primary device in one example embodiment may include network transceiver 307, a peer-to-peer transceiver 309 (which is a wireless transceiver), location detection logic 311, near field proximity detection logic 313, a display 315, a user interface 317, at least one processor 301 and a memory 303. Each of these components may be operatively coupled to the processor 301 and memory 303 by way of a communication bus 305. The display 315, if present, may provide a touchscreen user interface as part of the user interface 317 and, in some embodiments, may also provide a graphical user interface (GUI). The network transceiver 307, if present, may provide wireless communication capabilities for one or more WAN or WLAN communications systems such as, but not limited to, WiFi®, cellular, 2G, 3G or 4G wireless communications systems. The peer-to-peer transceiver 309 may provide wireless link connectivity capabilities such as, but not limited to, Bluetooth®, Wireless USB, ZigBee, Wi-Fi®, or other technologies, etc. The user interface (UI) 317 may include a track ball mouse, touch sensitive elements, physical switches, gyroscopic position sensors, etc. The display 315, if present, may include touchscreen functionality as noted above, and may be operative to receive command and control signals from the UI 317 directly, or via the processor 301, for functions such as, but not limited to, mouse cursor control click to provide selection input and or drag and drop features or other functionality in some embodiments. The near field communication proximity detection logic 313, if present, may use NFC technology to sense the proximity of the secondary device 400 and to also exchange information out-of-band during pairing using the peer-to-peer transceiver 309 in some embodiments. Location detection logic 311 may provide coordinate data or other location information and may include a Global Positioning System (GPS) receiver in some embodiments.

The memory 303 is a non-volatile, non-transitory memory, and stores a certificate 327. The memory 303 may also store executable instructions or executable code such as executable code 321C corresponding to a device lock logic 321 (in embodiments where the device lock logic 321 is implemented as software or firmware), and executable code 323C corresponding to a certificate generator 323 (in embodiments where the certificate generator 323 is implemented as software or firmware). That is, in some embodiments, the processor 301 is operative to execute the executable code 321C to implement device lock logic 321, and is operative to execute the executable code 323C to implement a certificate generator 323 and to perform the various methods of operation disclosed herein. However, in other embodiments, either the device lock logic 321, the certificate generator 323, or both may be implemented as ASICs, DSPs, FPGAs, hardwired circuitry (logic circuitry), or any combinations thereof.

The processor 301 is also operative to execute a wireless protocol stack 319, which may also have corresponding executable code stored in memory 303. The wireless protocol stack 319 operates in conjunction with the peer-to-peer transceiver 309 and may be, for example, a Bluetooth®, Wireless USB, ZigBee®, Wi-Fi®, or other wireless protocol stack.

The various embodiments also include non-volatile, non-transitory computer readable memory, other than memory 303, that may contain executable instructions or executable code, for execution by at least one processor, that when executed, cause the at least one processor to operate in accordance with the functionality and methods of operation herein described. The computer readable memory may be any suitable non-volatile, non-transitory, memory such as, but not limited to, programmable chips such as EEPROMS, flash ROM (thumb drives), compact discs (CDs) digital video disks (DVDs), etc., that may be used to load executable instructions or program code to other processing devices such as primary devices or secondary devices as described herein or other devices such as those that may benefit from the features of the herein described embodiments.

Various methods of operation in accordance with the embodiments are performed by the certificate generator 323 and device lock logic 321 both of which are operatively coupled to the wireless protocol stack 319. The operative coupling may be achieved by software coupling that allows information flow and command and control signals between the device lock logic 321, the wireless protocol stack 319, the certificate generator 323 and, in some embodiments, other applications 325. The software coupling between the components may, in some embodiments, utilize libraries or APIs contained within a libraries layer of the wireless protocol stack 319 or elsewhere such as within an operating system. Further details of operation of the primary device 300 may be better understood in conjunction with the example secondary device shown in FIG. 4, and also in conjunction with the flowcharts provide in FIG. 5 through FIG. 10.

The secondary device 400 may include components similar to the primary device 300 such as network transceiver 407, a peer-to-peer transceiver 409 (which is a wireless transceiver), near field proximity detection logic 413, a display 415, a user interface 417, at least one processor 401 and a memory 403. The secondary device 400 will also include a wear sensor 411. Each of these components may be operatively coupled to the processor 401 and memory 403 by way of a communication bus 405. The display 415, if present, may provide a touchscreen user interface as part of the user interface 417 and, in some embodiments, may also provide a graphical user interface (GUI). The network transceiver 407, if present, may provide wireless communication capabilities for one or more WAN or WLAN communications systems such as, but not limited to, Wi-Fi, cellular, 2G, 3G or 4G wireless communications systems. The peer-to-peer transceiver 409 may provide wireless link connectivity capabilities such as, but not limited to, Bluetooth®, Wireless USB, ZigBee®, Wi-Fi®, or other technologies, etc., but will use a wireless technology compatible with the primary device 300 such that it may establish a wireless link using the peer-to-peer transceiver 409. The user interface (UI) 417 may include a track ball mouse, touch sensitive elements, physical switches, gyroscopic position sensors, etc. The display 415, if present, may include touchscreen functionality as noted above, and may be operative to receive command and control signals from the UI 417 directly, or via the processor 401, for functions such as, but not limited to, mouse cursor control click to provide selection input and or drag and drop features or other functionality in some embodiments. The near field communication proximity detection logic 413, if present, may use NFC technology to sense the proximity of the primary device 300 and to also exchange information out-of-band during pairing using the peer-to-peer transceiver 409 in some embodiments.

The memory 403 is a non-volatile, non-transitory memory, and stores a copy of the certificate 327 provided that the wear sensor 411 indicates that the secondary device 400 is being worn by the user and that a wireless link with the primary device 300 using peer-to-peer transceiver 409 is maintained intact. The memory 403 may also store executable instructions or executable code such as executable code 420C corresponding to certificate handler 420, and executable code 427C corresponding to wear detection logic 427. That is, the processor 401 is operative to execute the executable code 420C to implement a certificate handler 420, and is operative to execute the executable code 427C to implement wear detection logic 427 and to perform the various methods of operation disclosed herein. However, in other embodiments, either the certificate handler 420, the wear detection logic 427 or both may be implemented as ASICs, DSPs, FPGAs, hard-wired circuitry (logic circuitry), or any combinations thereof. In other embodiments, the certificate handler 420 may be implemented partly in software or firmware and partly in hardware, i.e. the certificate handler 420 may be implemented as software or firmware and certificate handler 420 may be implemented as hardware (i.e. as an ASIC, DSP, FPGA, hard-wired circuitry (logic circuitry), or any combinations thereof) or vice versa.

The processor 401 is also operative to execute a wireless protocol stack 419, which may also have corresponding executable code stored in memory 403. The wireless protocol stack 419 operates in conjunction with the peer-to-peer transceiver 409 and is compatible with the primary device 300 and may be, for example, a Bluetooth®, Wireless USB, ZigBee®, Wi-Fi®, or other wireless protocol stack, etc.

Various methods of operation in accordance with the embodiments are performed by the certificate handler 420 and the wear detection logic 427 both of which are operatively coupled to the wireless protocol stack 419. The operative coupling may be achieved by software coupling that allows information flow and command and control signals between the certificate handler 420, the wear detection logic 427, the wireless protocol stack 319 and, in some embodiments, other applications 425. The software coupling between the components may, in some embodiments, utilize libraries or APIs contained within a libraries layer of the wireless protocol stack 419 or elsewhere such as within an operating system.

The wear detection logic 427 operates in conjunction with the wear sensor 411 to detect when the user is wearing the secondary device 400 and also to detect when the secondary device 400 is not being worn. In some embodiments, the wear sensor 411 may be a capacitive sensor such as described in U.S. patent application Ser. No. 13/776,103, filed Feb. 25, 2013, entitled "Capacitive Sensor" which is hereby incorporated by reference herein. In some embodiments, the wear sensor 411 and wear detection logic 427 may operate as described in the aforementioned U.S. Patent Application and also as described in U.S. patent application Ser. No. 13/776,099, filed Feb. 25, 2013, entitled "Wearable Device With Capacitive Sensor and Method of Operation Therefor" which is also hereby incorporated by reference herein.

Figure 5:
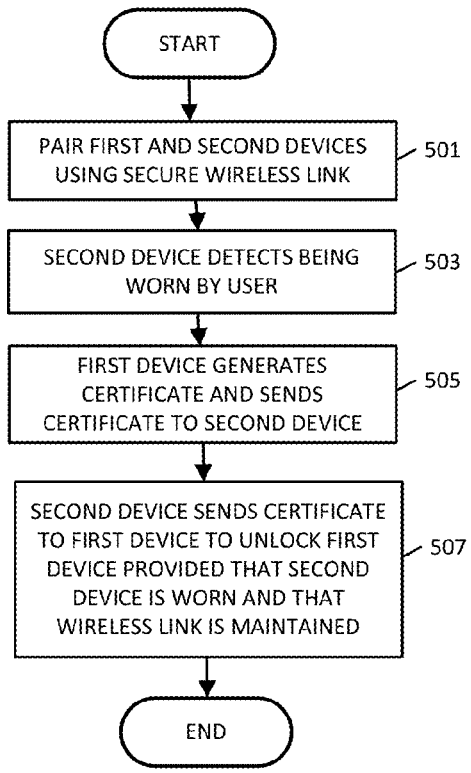
FIG. 5 is a flowchart of a method of operation in accordance with various embodiments.

One method of operation that may be understood with respect to the example primary device 300 and the example secondary device 400 is shown in FIG. 5 and begins in operation block 501 where the primary device 300 and secondary device 400 are paired using a wireless link. That is, the peer-to-peer transceiver 309 of the primary device 300 establishes a wireless link with the peer-to-peer transceiver 409 of the secondary device 400. The establishment of the wireless link is controlled by the corresponding wireless protocol stack 319 primary device 300 and wireless protocol stack 419 of secondary device 400. In operation block 503, the wear detection logic 427 obtains data from the wear sensor 411 to determine whether the secondary device 400 is being worn by the user.

In accordance with the embodiments, subsequent to establishment of the secure wireless link and as shown in operation block 505, the certificate generator 323 will generate a certificate 327 and store it in the memory 303. The certificate generator 323 will also communicate with the wireless protocol stack 319 to transmit the certificate 327 two the secondary device 400.

The secondary device 400 will receive a copy of the certificate 327 by way of the wireless protocol stack 419 and the certificate handler 420 will store the certificate 327 in memory 403. In operation block 507, under circumstances where the primary device 300 is to be unlocked, the certificate handler 420 retrieves the copy of the certificate 327 from memory 403 and sends it to the primary device 300 by way of the wireless protocol stack 419. On the primary device 300, the wireless protocol stack 319 receives the copy of the certificate 327, and the certificate generator 323 examines the received certificate to authenticate it against the certificate 327 stored in memory 303. If the received certificate copy matches the certificate 327 stored in memory 303, the received certificate copy (and also therefore the secondary device 400) may thus be considered authenticated and the certificate generator 323 may send the appropriate control signal to the device lock logic 321 to cause the primary device 300 to be unlocked.

The certificate generator 323 will only receive the certificate 327 from the secondary device 400 if the wear detection logic 427 determines that the secondary device 400 is being worn by the user and if the wireless link to the primary device 300 is maintained. In some embodiments, which are discussed herein below, the secondary device 400 may attempt to reestablish the wireless link with the primary device in order to send the certificate copy. The certificate handler 420 may determine the status of the wireless link by communicating with the wireless protocol stack 419 to check whether the wireless link has been disconnected or not. The certificate handler 420 will also communication with the wear detection logic 427 and will receive an indication from the wear detection logic 427 when the secondary device 400 is removed from the user's wrist and is not being worn. If the secondary device 400 is determined to be not removed and not worn by the user, then the certificate handler 420 will eradicate the certificate 327 from the memory 403. In some embodiments, the certificate handler 420 will also eradicate the certificate 327 if the wireless link is disconnected. The eradication of the certificate 327 may be performed in any number of various ways that are understood by those of ordinary skill. For example, in some embodiments, the memory location at which the certificate 327 was stored within memory 403 may be overwritten explicitly with a sequence of bits such that the certificate 327 is unrecoverable from memory 403. The sequence of bits may be any random sequence that constitutes noise or garbage and that thus serves to eradicate the certificate 327 and render it unrecoverable. The method of operation illustrated in FIG. 5 ends with the transmission of the certificate 327 from the secondary device 400 to the primary device 300, at which point, the primary device 300 or some application of the primary device 300 may be unlocked for user access.

Figure 6:
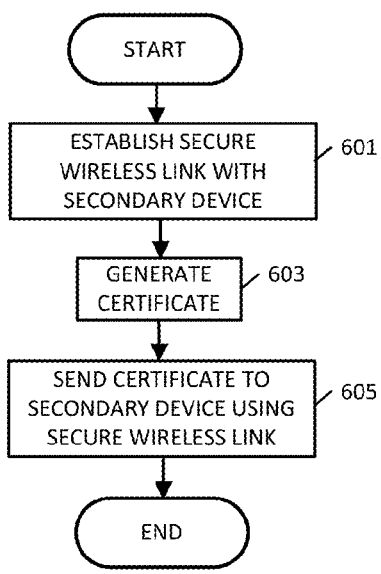
FIG. 6 is a flowchart of a method of operation of a primary device in accordance with an embodiment.

Further details of operation of the primary device 300 are illustrated in FIG. 6. In operation block 601, the primary device 300 establishes a secure wireless link with the secondary device 400. In operation block 603, the certificate generator 323 generates the certificate 327 and stores to certificate 327 in memory 303. In some embodiments, the primary device 300 may display a prompt on display 315 requiring the user to enter the primary device 300 unlock password prior to generation of the certificate 327. In that case the certificate 327 will not be generated in the absence of the primary device 300 unlock password, and the certificate generator 323 will eventually timeout. In that case, the primary device 300 will only be capable of being unlocked by manual entry of the primary device 300 unlock password. That is, the secondary device 400 will not be in possession of the certificate 327 unless the method of operation is reinitiated. In operation block 605, the certificate generator 323 communicates with the wireless protocol stack 319 and sends the certificate 327 to the secondary device 400 using the secure wireless link over peer-to-peer transceiver 309. The method of operation then ends.

Figure 7:
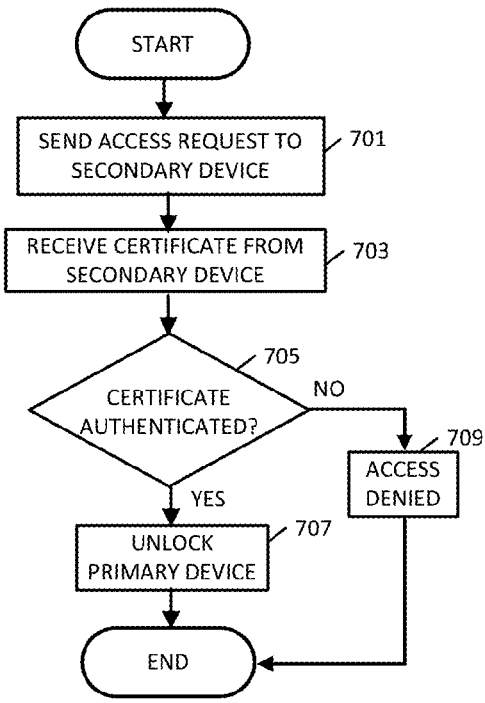
FIG. 7 is a flowchart of a method of operation of a secondary device in accordance with an embodiment.

Another method of operation of the primary device in one embodiment is illustrated in FIG. 7. In operation block 701, the device lock logic 321 may detect that the user is attempting to access the primary device 300. In response to the detected access attempt, the device lock logic 321 may communicate with the wireless protocol stack 319 to transmit an access request to the secondary device 400 over the wireless link. In response to receiving the access request, the certificate handler 420 on the secondary device 400 communicates with the wireless protocol stack 419 to receive the access request from the primary device 300. In response to receiving the access request, the certificate handler 420 communicates with the certificate handler 420 which retrieves the copy of the certificate 327 from memory 403, and transmits the certificate 327 over the wireless link to the primary device 300. As shown in operation block 703, the primary device 300 receives the copy of certificate 327 from the secondary device 400. In decision block 705, the certificate generator 323 examines the received copy of the certificate 327 to ensure that it matches with the certificate 327 stored in memory 303. If the certificate generator 323 determines that the certificate is authentic, then the certificate generate greater 323 communicates with the device lock logic 321 to unlock the primary device 300. However, if the certificate is found to be invalid in decision block 707, then the method of operation proceeds to operation block 711 and access is denied. The device lock logic 321 may communicate with the display 315 in some embodiments to display an "access denied" message as shown in operation block 709. However in other embodiments, no message will be displayed and the device lock logic 321 will only continue to maintain the primary device 300 in a locked state. The method of operation then ends as shown.

Figure 8:
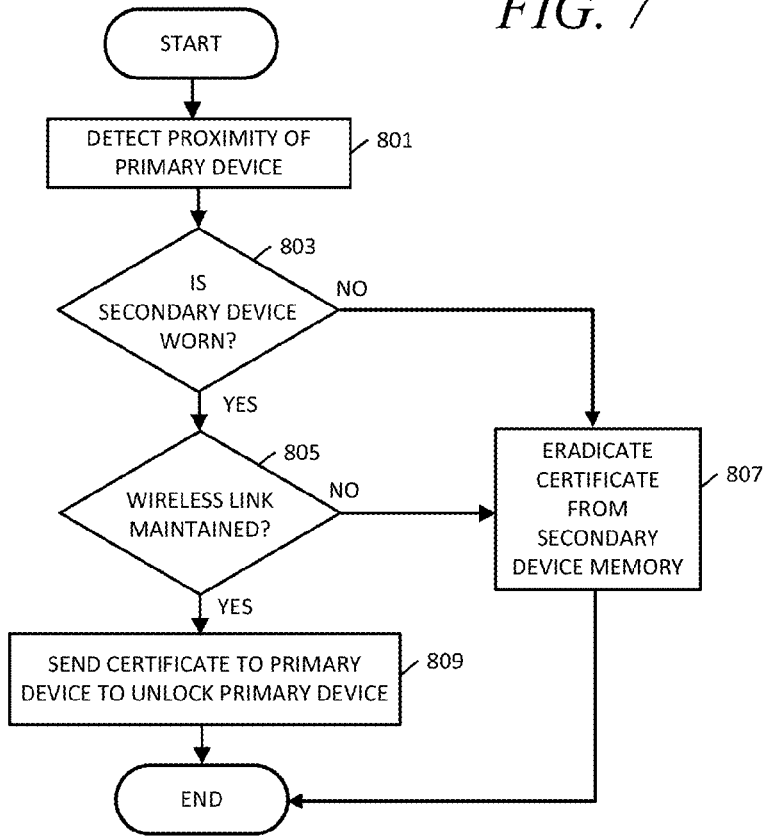
FIG. 8 is a flowchart of a method of operation of a secondary device in accordance with an embodiment.

FIG. 8 is a flowchart of a method of operation of a secondary device in accordance with an embodiment. In operation block 801, the secondary device 400 utilizes the near field proximity detection logic 413 or some other form of proximity detection to determine that the primary device 300 is within a suitable proximity such that the primary device 300 should be automatically unlocked. In some embodiments, the proximity distance may be predetermined or may be determined by a user setting. In one example, the near field proximity detection logic 413 must detect that the secondary device 400 is extremely close to the primary device 300 such that the two devices are almost in physical contact. The near field proximity detection logic 313 may interact with the near field proximity detection logic 413 such that the near field proximity detection logic 413 detects the presence of the primary device 300. In some embodiments, additional security information such as a security code may be exchanged between the primary device 300 and the secondary device 400 using near field communication. In response to detecting the presence of the primary device 300, the certificate handler 420 will communicate with the wear detection logic 427 to determine if the secondary device 400 is being worn by the user. Additionally, the certificate handler 420 will communicate with the wireless protocol stack 419 to determine whether the wireless link with the primary device 300 is still maintained. In some embodiments, if the wireless link is disconnected the certificate handler 420 may attempt to re-establish the wireless link. As shown in decision block 803, the secondary device 400 will determine if it is being worn. If yes, then the secondary device 400 will determine whether the wireless link is still maintained as shown in decision block 805. If both conditions are met in decision block 803 and decision block 805, then the certificate handler 420 will communicate with the wireless protocol stack 419 and will send the certificate to the primary device 300 to unlock the primary device 300 as shown in operation block 809. The method of operation then ends as shown. However, if either of the two conditions is not met in either decision block 803 or decision block 805, then the method of operation proceeds to operation block 807 and the certificate 327 is eradicated from the memory 403 of the secondary device 400. The method of operation then ends as shown.

Figure 9:
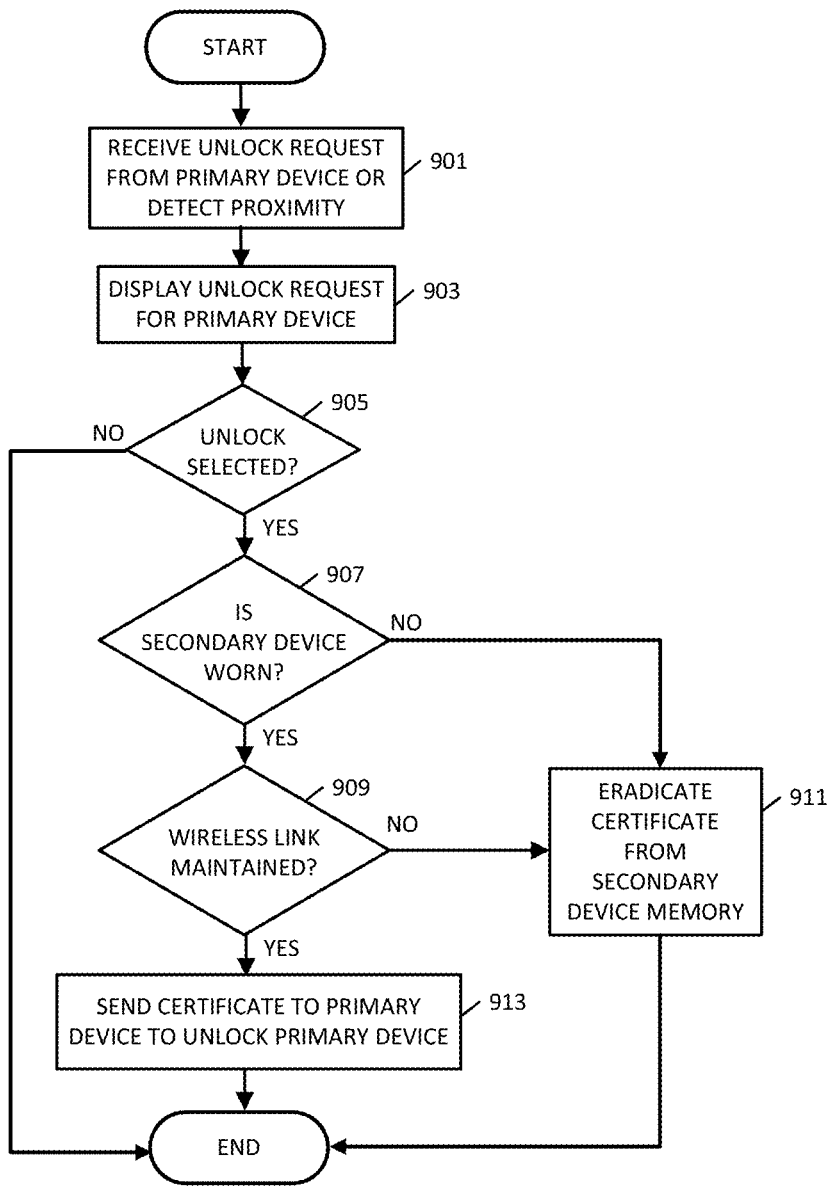
FIG. 9 is a flowchart of a method of operation of a secondary device in accordance with an embodiment.

FIG. 9 is a flowchart of a method of operation of a secondary device in accordance with another embodiment. In operation block 901, the secondary device 400 may receive an unlock request from the primary device 300 or a may detect proximity to the primary device 300 as was discussed above with respect to various other methods of operation. In operation block 903, the secondary device 400 may display an unlock request for the primary device 300. An example of this was described above with respect to FIG. 2 where the secondary device 201 displayed the user prompt 219 asking the user whether to unlock the primary device 200. As shown in FIG. 2, the user can respond to the user prompt 219 by selecting "yes" or "no". Thus, at decision block 905 in FIG. 9, the user may select "no" and the method of operation may then ends as shown. However if the user decides to unlock the primary device 300 in decision block 905 and selects "yes", then the secondary device 400 will check the conditions as shown in decision block 907 and decision block 909. That is, the secondary device 400 will check whether it is being worn in decision block 907 and will check whether the wireless link is maintained to the primary device 300 as shown in decision block 909. Provided that both of these conditions are appropriately met, then the secondary device 400 will send a copy of the certificate 327 to the primary device 300 to unlock it as shown in operation block 913. The method of operation then ends. However, if either of the two conditions of decision block 907 or decision block 909 are not met, then the method of operation proceeds to operation block 911 and the certificate 327 is eradicated from memory 403 of the secondary device 400. The method of operation then ends as shown.

FIG. 10 illustrates yet another method of operation of a primary device in accordance with another embodiment. In the embodiment illustrated in FIG. 10, a two-step authentication process is employed. The method of operation shown in FIG. 10 begins subsequent to pairing the primary device 300 with the secondary device 400 and establishing a secure wireless link. The method of operation also requires that the user is wearing the secondary device 400. In operation block 1001, the primary device 300 receives user input of a first alphanumeric code, such as a user-defined PIN code, entered using the user interface 317. In response to receiving the first alphanumeric code, the device lock logic 321 sends a notification or request to the secondary device 400 as shown in operation block 1003. In operation block 1005, the primary device 300 waits to receive a second alphanumeric code from the secondary device 400 for a predetermined time period.

On the secondary device 400, in response to the received notification or request, the secondary device 400 will prompt the user to input a second user-defined alphanumeric code by way of the user interface 417. In operation block 1007, the second alphanumeric code is stored in memory 403 by the secondary device 400, and is sent to the primary device 300 which receives and stores it in memory 303. The method of operation described above with respect to FIG. 10 is based on the primary device 300 and the secondary device 400 having an established secure wireless link and being within a relatively close proximity such that the user may enter both alphanumeric codes within a time out period of the primary device 300.

Subsequent to the initialization of the two-step authentication process of FIG. 10, the primary device 300 is unlocked by following a similar method of operation. However, rather than requiring the user to input the second alphanumeric code in the secondary device 400 as in operation block 1005, the secondary device 400 automatically retrieves the second alphanumeric code from memory 403 and sends it to the primary device 300. The primary device 300 receives the second alphanumeric code in operation block 1007 and then compares it with the version stored in memory 303. If the two versions of the second alphanumeric code match, and assuming the first alphanumeric code entered by way of user interface 317 is correct, the primary device will be unlocked.

A method of operation of a secondary device 400 in accordance with another embodiment is shown in FIG. 11. In operation block 1101, the secondary device 400 receives an unlock request or notification from the primary device 300. This may occur in response to the user attempting to access and use the primary device 300 user interface 317. That is, in some embodiments, the primary device 300 may go into a sleep mode, or some other low power mode, where the user may "wake up" the primary device 300 by interacting with the display 315 or with the user interface 317. In that case, the primary device 300 will send the unlock request or notification to the secondary device 400 in response to being "woken up." In other embodiments, the secondary device 400 may detect the presence of the primary device 300, for example using NFC, and may initiate the method of operation. In yet another embodiment, the primary device 300 may detect the presence of the secondary device 400, for example using NFC, and may send the unlock request to the secondary device 400 in response to detecting the proximity of the secondary device 400.

In any of the above example embodiments, the secondary device 400 will proceed to send the certificate 327 to the primary device 300 if the criteria of decision block 1103 and decision block 1105 are met. If the secondary device is worn in decision block 1103, the method of operation proceeds to decision block 1105 and checks the status of the wireless link. In operation block 1111, if the wireless link is present in decision block 1105, then a copy of the certificate 327 is sent to the primary device 300.

If at any time the secondary device 400 is removed from the user's wrist and is no longer worn in decision block 1103, the certificate 327 is eradicated from memory 403 as shown in operation block 1107 and the method of operation ends. That is, the secondary device 400 can no longer be used to unlock the primary device 300 until a new certificate is generated using one of the methods of operation described previously above. However, in the embodiment of FIG. 11, if the wireless link is found to be disconnected in decision block 1105, the certificate is not eradicated from memory. Instead, the secondary device 400 attempts to establish another wireless link with the primary device 300 as shown in operation block 1109. If the wireless link is successfully established in operation block 1109, then a copy of certificate 327 is sent to the primary device 300 in operation block 1111 and the method of operation ends. In some embodiments, the primary device 300 may display a prompt on display 315 requiring the user to enter the primary device 300 unlock password prior to reestablishing the wireless link. In that case the wireless link will not be allowed to be established in the absence of the primary device 300 unlock password. A timeout procedure may be used in operation block 1109 such that if the wireless link cannot be established with the primary device 300 within a predetermined timeout period, the method of operation also terminates.

The flowchart of FIG. 12 shows a method of operation of a secondary device using the wear sensor 411 and wear detection logic 427 in accordance with an embodiment. The method of operation begins and in operation block 1201, the certificate handler 420 communicates with the wear detection logic 427 to monitor the wear sensor 411. In decision block 1203, if the secondary device 400 is being worn as determined by the wear detection logic 427, monitoring continues in operation block 1201. However, if the wear detection logic 427 notifies the certificate handler 420 that the secondary device 400 is no longer being worn, then the certificate handler 420 eradicates the certificate 327 from memory 403 as shown in operation block 1205 and the method of operation ends. In some embodiments, the certificate handler 420 will also send a notification to the primary device by way of the wireless protocol stack 419 (and over the wireless link) to notify the primary device that the secondary device is no longer being worn. In response to the notification message from the secondary device, the certificate generator 323 may eradicate the certificate 327 stored in memory 303. In some embodiments, the certificate generator 323 of the primary device may also eradicate the certificate 327 if the wireless protocol stack 319 provides an indication that the wireless link with the secondary device has been disconnected. In that case, the user will have to manually enter a pin into the display 315 to unlock the primary device, until the certificate generation methods described above is again invoked between the primary device and the secondary device.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A method comprising:
   detecting, by a wearable device, that the wearable device is being worn;
   receiving, by the wearable device, a certificate from a primary device over a secure wireless link, the wearable device being paired to the primary device using the secure wireless link;
   storing the certificate in memory of the wearable device;
   sending the certificate, over the secure wireless link, to the primary device to unlock the primary device;
   detecting that the wearable device is no longer being worn or that the secure wireless link between the wearable device and the primary device is disconnected; and
   eradicating the certificate from memory of the wearable device in response to detecting that the wearable device is no longer being worn or that the secure wireless link between the wearable device and the primary device is disconnected.

2. The method of claim 1, further comprising:
   unlocking, by the primary device, the primary device in response to the primary device receiving the certificate from the wearable device.

3. The method of claim 1, further comprising:
   receiving, by the wearable device, a request to unlock the primary device over the secure wireless link; and
   wherein the sending the certificate, over the secure wireless link, to the primary device to unlock the primary device is in response to the request.

4. The method of claim 1, further comprising:
   generating the certificate by the primary device in response to establishing the secure wireless link with the wearable device.

5. The method of claim 1, further comprising:
   receiving, by the primary device, from the wearable device the certificate via the secure wireless link;
   authenticating, by the primary device, the certificate; and
   unlocking the primary device in response to authenticating the certificate.

6. The method of claim 1, further comprising:
   following eradication of the certificate, establishing a secure link;
   receiving a new certificate; and
   sending the new certificate to the primary device, to unlock the primary device.

7. The method of claim 1, further comprising:
   detecting that the wearable device is in proximity to the primary device; and
   sending a request to the wearable device, requesting the certificate, in response to detecting that the wearable device is in proximity to the primary device.

8. The method of claim 6, further comprising:
   detecting that the primary device is in proximity to the wearable device using near field communication technology.

9. A wearable device, comprising:
   a wireless transceiver, operative to pair with a primary device to establish a secure wireless link therewith;
   a wear sensor;
   wear detection logic, operatively coupled to the wear sensor, the wear detection logic operative to detect that the wearable device is being worn by using the wear sensor;
   a certificate handler, operatively coupled to the wear detection logic, the certificate handler operative to receive a certificate from a primary device over a secure wireless link when the wearable device being is paired to the primary device using the secure wireless link, to send the certificate, over the secure wireless link, to the primary device to unlock the primary device, and to eradicate the certificate from the memory of the wearable device in response to one or more of a detection that the wearable device is no longer being worn and a detection that the secure wireless link between the wearable device and the primary device is disconnected; and
   memory, operatively coupled to the certificate handler and operative to store the certificate.

10. The wearable device of claim 9, wherein the wear detection logic is further operative to detect that the wearable device is no longer being worn.

11. The wearable device of claim 9, wherein the certificate handler is further operative to:
   communicate with the wireless transceiver by way of a wireless protocol stack and to detect that the secure wireless link between the wearable device and the primary device is disconnected.

12. The wearable device of claim 9, wherein the certificate handler is further operative to receive a request to unlock the primary device over the secure wireless link; and
send the certificate, over the secure wireless link, to the primary device to unlock the primary device in response to the request.

13. The wearable device of claim 9, wherein the wireless transceiver is further operative to, following eradication of the certificate, establish a secure link with primary device; and
wherein the certificate handler is further operative to:
receive a new certificate; and
send the new certificate to the primary device, to unlock the primary device.

14. The wearable device of claim 13, wherein the proximity detector is a near field communication proximity detector.

15. A system comprising:
a wearable device; and
a primary device, the wearable device comprising:
a wireless transceiver, operative to pair with a primary device to establish a secure wireless link therewith;
a wear sensor;
wear detection logic, operatively coupled to the wear sensor, the wear detection logic operative to detect that the wearable device is being worn by using the wear sensor;
a certificate handler, operatively coupled to the wear detection logic, the certificate handler operative to receive a certificate from a primary device over a secure wireless link when the wearable device being is paired to the primary device using the secure wireless link, to send the certificate, over the secure wireless link, to the primary device to unlock the primary device, and to eradicate the certificate from the memory of the wearable device in response to one or more of a detection that the wearable device is no longer being worn and a detection that the secure wireless link between the wearable device and the primary device is disconnected; and
memory, operatively coupled to the certificate handler and operative to store the certificate; and
the primary device, comprising:
a primary device wireless transceiver, operative to communicate with the wearable device wireless transceiver to establish the secure wireless link therewith;
primary device lock logic, operatively coupled to the primary device wireless transceiver, the primary device lock logic operative to unlock the primary device in response to receiving the certificate from the wearable device.

16. The system of claim 15, further including a certificate generator operative to genera the certificate in response to the primary device wireless transceiver establishing the secure wireless link with the wearable device wireless transceiver.

17. The system of claim 15, wherein the primary device lock logic is further operative to:
receive a certificate from the wearable device via the secure wireless link;
authenticate the certificate; and
unlock the primary device in response to authenticating the certificate.

18. The system of claim 15, wherein the primary device further comprises:
a proximity detector, operatively coupled to the primary device lock logic, the proximity detector operative to detect that the wearable device is in proximity to the primary device; and wherein the certificate generator is further operative to send a request to the wearable device, requesting the certificate, in response to detecting that the wearable device is in proximity to the primary device.

* * * * *